United States Patent
Owaki et al.

(10) Patent No.: US 11,995,163 B2
(45) Date of Patent: May 28, 2024

(54) BIOMETRIC INFORMATION AUTHENTICATION DEVICE

(71) Applicants: KABUSHIKI KAISHA TOKAI RIKA DENKI SEISAKUSHO, Aichi (JP); TOYOTA JIDOSHA KABUSHIKI KAISHA, Aichi-ken (JP)

(72) Inventors: Rijin Owaki, Aichi (JP); Yosuke Ohashi, Aichi (JP); Takahiko Ando, Aichi (JP); Yuya Goto, Aichi-ken (JP); Yasuhisa Ohta, Aichi-ken (JP); Naoyuki Takada, Aichi-ken (JP); Daisuke Ogawa, Aichi (JP)

(73) Assignees: KABUSHIKI KAISHA TOKAI RIKA DENKI SEISAKUSHO, Aichi (JP); TOYOTA JIDOSHA KABUSHIKI KAISHA, Aichi-ken (JP)

( * ) Notice: Subject to any disclaimer, the term of this patent is extended or adjusted under 35 U.S.C. 154(b) by 584 days.

(21) Appl. No.: 17/266,483

(22) PCT Filed: Aug. 6, 2019

(86) PCT No.: PCT/JP2019/030989
§ 371 (c)(1),
(2) Date: Feb. 5, 2021

(87) PCT Pub. No.: WO2020/032064
PCT Pub. Date: Feb. 13, 2020

(65) Prior Publication Data
US 2021/0303670 A1    Sep. 30, 2021

(30) Foreign Application Priority Data
Aug. 7, 2018  (JP) .................. 2018-148185

(51) Int. Cl.
*G06F 21/32*    (2013.01)
*G06F 9/54*    (2006.01)
(Continued)

(52) U.S. Cl.
CPC .............. *G06F 21/32* (2013.01); *G06F 9/542* (2013.01); *G06V 40/1306* (2022.01);
(Continued)

(58) Field of Classification Search
CPC .... G06F 21/32; H04L 63/0861; H04L 9/3231
See application file for complete search history.

(56) References Cited

U.S. PATENT DOCUMENTS 7,864,987 B2 * 1/2011 Venkatanna ............ G06F 21/32
                                                     704/250
8,312,290 B2 * 11/2012 Chiou .................. H04L 9/3231
                                                     713/168
(Continued)

FOREIGN PATENT DOCUMENTS

CN        102831724 A       12/2012
JP        2006-187387 A     7/2006
(Continued)

OTHER PUBLICATIONS

W. Meng, D. S. Wong, S. Furnell and J. Zhou, "Surveying the Development of Biometric User Authentication on Mobile Phones," in IEEE Communications Surveys & Tutorials, vol. 17, No. 3, pp. 1268-1293, thirdquarter 2015. (Year: 2015).*
(Continued)

*Primary Examiner* — Kari L Schmidt
(74) *Attorney, Agent, or Firm* — Studebaker & Brackett PC (57) ABSTRACT

A biometric information authentication device includes a control unit to, during biometric authentication by comparing biometric information of a user read by a biometric
(Continued)

information sensor to preliminarily registered biometric information of a registered person, issue a notification to encourage the user to register different biometric information when a predetermined condition for determining that a biometric authentication after a current biometric authentication is highly likely to fail is met.

10 Claims, 4 Drawing Sheets

(51) Int. Cl.
| | |
|---|---|
| *G06V 40/12* | (2022.01) |
| *G06V 40/13* | (2022.01) |
| *G06V 40/14* | (2022.01) |
| *G06V 40/18* | (2022.01) |
| *G06V 40/50* | (2022.01) |

(52) U.S. Cl.
CPC ...... *G06V 40/1359* (2022.01); *G06V 40/1365* (2022.01); *G06V 40/14* (2022.01); *G06V 40/18* (2022.01); *G06V 40/50* (2022.01); *G06F 2221/2117* (2013.01)

(56) References Cited

U.S. PATENT DOCUMENTS

| | | | |
|---|---|---|---|
| 9,305,155 B1* | 4/2016 | Vo | G06F 3/0482 |
| 9,430,629 B1* | 8/2016 | Ziraknejad | G06F 16/583 |
| 10,163,105 B1* | 12/2018 | Ziraknejad | G06Q 20/3274 |
| 10,637,662 B2* | 4/2020 | Baughman | G06F 21/602 |
| 10,650,218 B2* | 5/2020 | Kapinos | G06V 40/1353 |
| 11,275,918 B2* | 3/2022 | Kim | G07C 9/257 |
| 2003/0046540 A1* | 3/2003 | Nakamura | B60R 25/252 |
| | | | 713/168 |
| 2003/0163710 A1* | 8/2003 | Ortiz | H04L 63/0861 |
| | | | 713/186 |
| 2004/0255168 A1* | 12/2004 | Murashita | G07C 9/257 |
| | | | 726/5 |
| 2005/0286744 A1* | 12/2005 | Yoshizu | G06V 40/63 |
| | | | 382/115 |
| 2006/0072793 A1* | 4/2006 | Determan | G06V 40/18 |
| | | | 382/117 |
| 2006/0098847 A1* | 5/2006 | Takahashi | G06V 30/242 |
| | | | 340/5.83 |
| 2006/0193503 A1* | 8/2006 | Bauchspies | G06V 40/10 |
| | | | 382/124 |
| 2007/0150745 A1* | 6/2007 | Peirce | G06V 40/10 |
| | | | 713/186 |
| 2007/0237367 A1* | 10/2007 | Yamato | G06F 18/28 |
| | | | 382/118 |
| 2007/0294540 A1* | 12/2007 | Wadayama | G06Q 20/40145 |
| | | | 713/186 |
| 2008/0056544 A1* | 3/2008 | Aikawa | G06Q 20/40145 |
| | | | 382/124 |
| 2008/0172725 A1* | 7/2008 | Fujii | G07C 9/37 |
| | | | 726/5 |
| 2012/0286931 A1* | 11/2012 | Semba | G06V 10/811 |
| | | | 340/5.83 |
| 2012/0291111 A1* | 11/2012 | Kamakura | G06V 10/95 |
| | | | 726/7 |
| 2012/0326841 A1* | 12/2012 | Aoki | G06F 21/32 |
| | | | 340/5.82 |
| 2013/0263282 A1* | 10/2013 | Yamada | G06V 40/1335 |
| | | | 726/28 |
| 2014/0016833 A1* | 1/2014 | Ide | G06V 40/10 |
| | | | 382/115 |
| 2014/0282931 A1* | 9/2014 | Protopapas | B60R 25/2081 |
| | | | 726/5 |
| 2014/0333414 A1* | 11/2014 | Kursun | G06V 40/50 |
| | | | 340/5.82 |
| 2014/0363055 A1* | 12/2014 | Yamada | G06V 30/248 |
| | | | 382/115 |
| 2015/0123766 A1* | 5/2015 | St. John | G07C 9/25 |
| | | | 340/5.82 |
| 2015/0310444 A1* | 10/2015 | Chen | G06Q 20/308 |
| | | | 705/44 |
| 2016/0147987 A1* | 5/2016 | Jang | G06V 40/1365 |
| | | | 726/19 |
| 2016/0292536 A1* | 10/2016 | Irie | G06V 40/172 |
| 2017/0041314 A1* | 2/2017 | Shin | G06F 21/32 |
| 2017/0046508 A1* | 2/2017 | Shin | G06V 40/70 |
| 2017/0091533 A1* | 3/2017 | Mardikar | G06V 40/70 |
| 2017/0230362 A1* | 8/2017 | Wang | H04L 63/0861 |
| 2017/0262719 A1* | 9/2017 | Yamazaki | G06F 21/35 |
| 2018/0173930 A1 | 6/2018 | Han et al. | |
| 2018/0239976 A1* | 8/2018 | Cornelius | H04W 12/33 |
| 2018/0293370 A1* | 10/2018 | Kim | G06F 21/32 |
| 2018/0309792 A1* | 10/2018 | Obaidi | G06F 21/32 |
| 2019/0018942 A1* | 1/2019 | Takada | G06V 40/50 |
| 2019/0095771 A1 | 3/2019 | Okuno | |
| 2020/0019690 A1* | 1/2020 | Sim | G06F 21/32 |
| 2021/0334345 A1* | 10/2021 | Sim | G06F 21/45 |
| 2022/0277070 A1* | 9/2022 | Robert Jose | H04L 63/0861 |
| 2023/0360429 A1* | 11/2023 | Min | G06V 40/1371 |
| 2024/0029476 A1* | 1/2024 | Kim | G06V 40/1365 |

FOREIGN PATENT DOCUMENTS

| | | |
|---|---|---|
| JP | 2006-248244 A | 9/2006 |
| JP | 2008-174095 A | 7/2008 |
| JP | 2017-052380 A | 3/2017 |
| JP | 2017-071317 A | 4/2017 |
| KR | 1020080109118 A | 12/2008 |
| WO | 2018/08548 A1 | 1/2018 |

OTHER PUBLICATIONS

F. Alonso-Fernandez, J. Fierrez and J. Ortega-Garcia, "Quality Measures in Biometric Systems," in IEEE Security & Privacy, vol. 10, No. 6, pp. 52-62, Nov.-Dec. 2012. (Year: 2012).*

* cited by examiner

BIOMETRIC INFORMATION AUTHENTICATION DEVICE

CROSS-REFERENCE TO RELATED APPLICATIONS

The present application is a U.S. National Phase of PCT/JP2019/030989 filed on Aug. 6, 2019 claiming priority to Japanese Patent Application No. 2018-148185 filed on Aug. 7, 2018. The disclosure of the PCT Application is hereby incorporated by reference into the present Application.

The present invention relates to a biometric information authentication device.

BACKGROUND ART

A start control device is known which is provided with a start switch giving an instruction to start or stop a drive source, a start-up means for starting the drive source, a fingerprint sensor for reading fingerprints, and a control means which, based on inputs from the fingerprint sensor and the start switch, implements a start-up process to control activation of the start-up means (see, e.g., Patent Literature 1).

When the start switch gives an instruction to start, the control means of the start control device performs fingerprint verification by comparing a fingerprint read by the fingerprint sensor with a pre-registered fingerprint before start-up by the start-up means, and once a match is found, the control means authenticates the user as a genuine user and allows the start-up means to start up.

CITATION LIST

Patent Literature

Patent Literature 1: JP 2008/174095 A

SUMMARY OF INVENTION

Technical Problem

With the fingerprint sensor of the start control device disclosed in Patent Literature 1, authentication may suddenly start to fail if, e.g., the condition of the finger changed due to injury, etc., from when registration was done, and the user may feel distrust toward the device.

It is an object of the invention to provide a biometric information authentication device that can reduce distrust of users.

Solution to Problem

According to an embodiment of the invention, a biometric information authentication device comprises a control unit to, during biometric authentication by comparing biometric information of a user read by a biometric information sensor to preliminarily registered biometric information of a registered person, issue a notification to encourage the user to register different biometric information when a predetermined condition for determining that a biometric authentication after a current biometric authentication is highly likely to fail is met.

According to an embodiment of the invention, it is possible to provide a biometric information authentication device that can reduce distrust of users.

DESCRIPTION OF EMBODIMENTS

Summary of the Embodiment

A biometric information authentication device in an embodiment has a control unit to, during biometric authentication by comparing biometric information of a user read by a biometric information sensor to preliminarily registered biometric information of a registered person, issue a notification to encourage the user to register different biometric information when a predetermined condition for determining that a biometric authentication after a current biometric authentication is highly likely to fail is met.

When biometric authentication is highly likely to fail from the next time onwards, the biometric information authentication device can encourage registration of different biometric information. Therefore, it is possible to suppress a sudden failure of biometric authentication and thereby reduce distrust of users, as compared to when not encouraging registration.

Embodiment (General Configuration of a Start Switch Device 1)

Figure 1A:
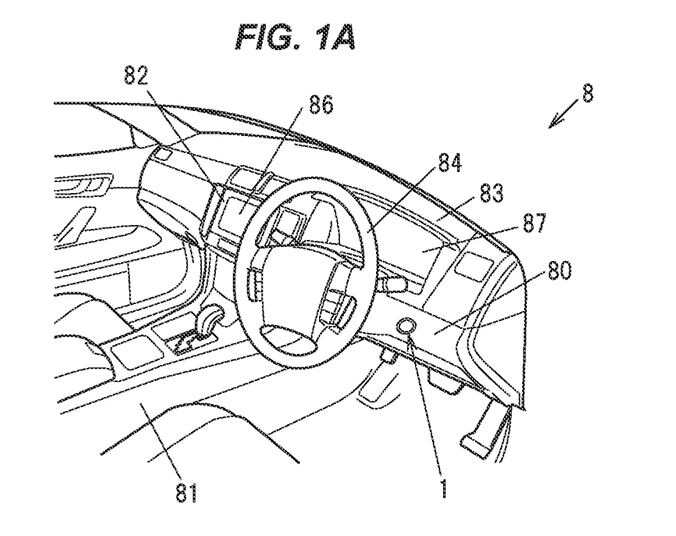
FIG. 1A is an explanatory diagram illustrating the inside of a vehicle in which a start switch device in an embodiment is arranged.
Figure 1B:
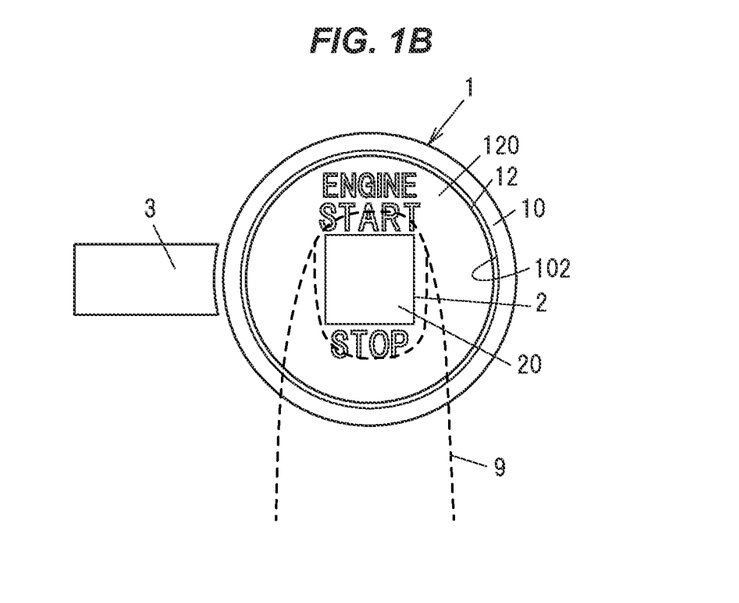
FIG. 1B is a front view showing the start switch device in the embodiment.
Figure 2A:
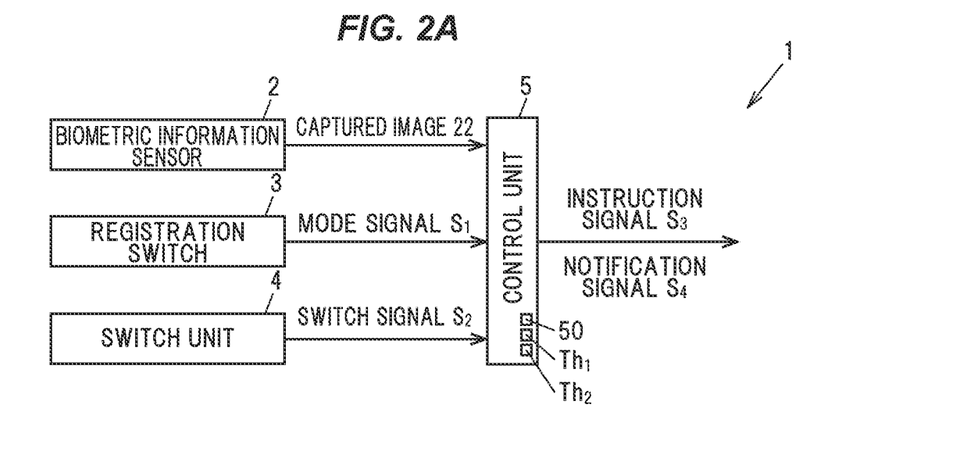
FIG. 2A is a block diagram illustrating the start switch device in the embodiment.
Figure 2B:
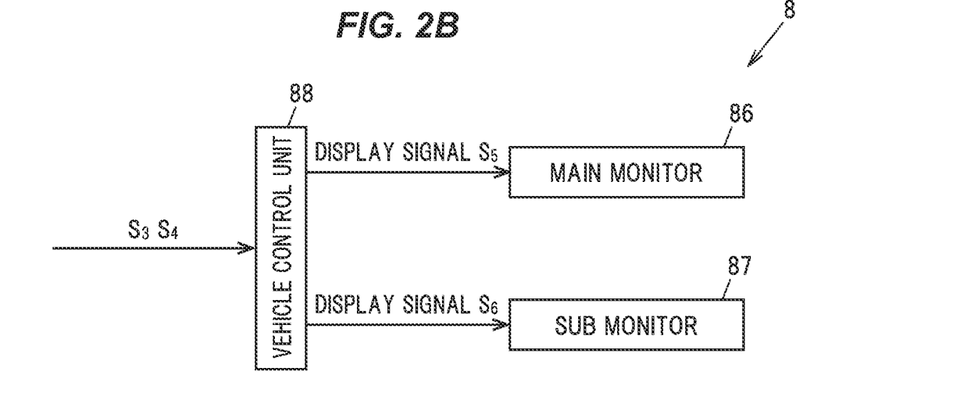
FIG. 2B is a block diagram illustrating the vehicle.
Figure 2C:
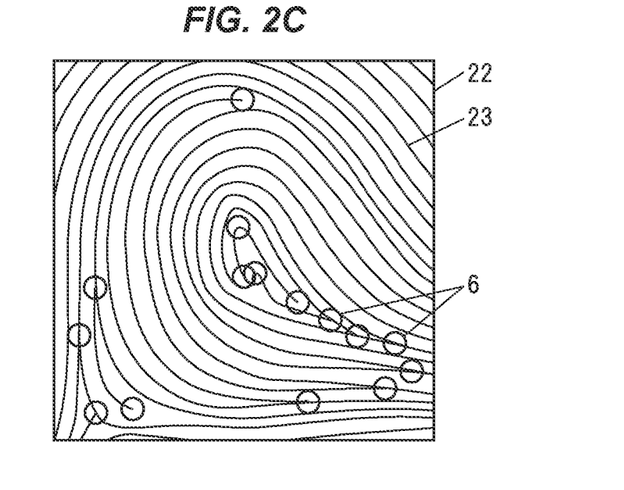
FIG. 2C is an explanatory diagram illustrating a captured image that is captured by a biometric information sensor of the start switch device in the embodiment.
Figure 3A:
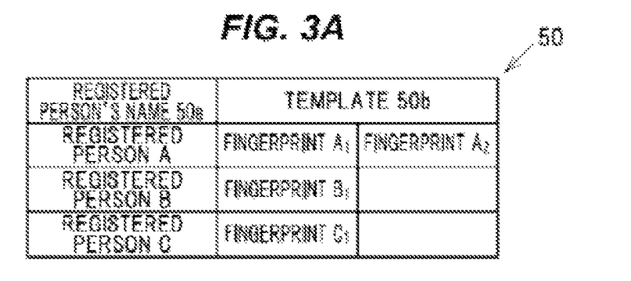
FIG. 3A is an explanatory diagram illustrating registered biometric information stored in the start switch device in the embodiment.
Figure 3B:
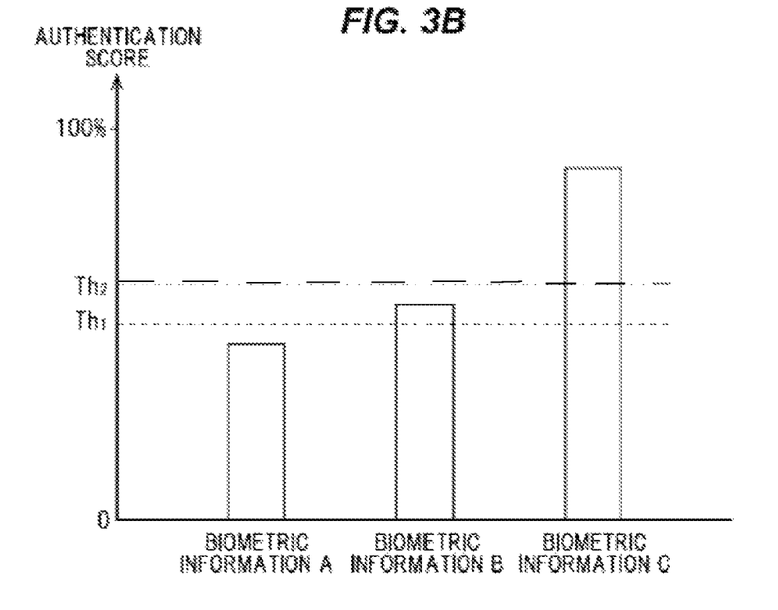
FIG. 3B is an explanatory diagram illustrating an authentication score of each biometric information in the start switch device in the embodiment.
Figure 3C:
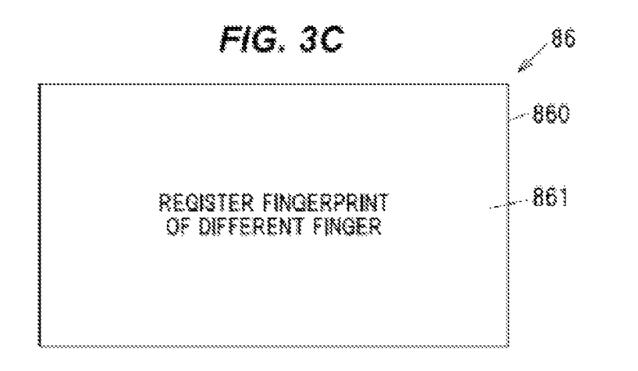
FIG. 3C is an explanatory diagram illustrating a notification issued by the start switch device in the embodiment and displayed on a main monitor.

FIG. 1A is an explanatory diagram illustrating the inside of a vehicle in which a start switch device in the embodiment is arranged, and FIG. 1B is a front view showing the start switch device in the embodiment. FIG. 2A is a block diagram illustrating the start switch device in the embodiment, FIG. 2B is a block diagram illustrating the vehicle, and FIG. 2C is an explanatory diagram illustrating an example of a captured image that is captured by a biometric information sensor of the start switch device in the embodiment. FIG. 3A is an explanatory diagram illustrating registered biometric information stored in the start switch device in the embodiment, FIG. 3B is an explanatory diagram illustrating an authentication score of each biometric information in the start switch device in the embodiment, and FIG. 3C is an explanatory diagram illustrating a notification issued by the start switch device in the embodiment and displayed on a main monitor.

In each drawing of the embodiment described below, a scale ratio may be different from an actual ratio. In addition, in FIGS. 2A and 2B, flows of main signals and information, etc., are indicated by arrows.

As shown in FIG. 1A, the start switch device 1 as the biometric information authentication device is arranged on, e.g., a panel 80 located in front of a user sitting in a driver's seat and at the periphery of a steering wheel 84, a floor console 81 located between the driver's seat and the front passenger seat, or the steering wheel 84, etc. This start switch device 1 can instruct a vehicle control unit 88 of a vehicle 8 to start, or to prepare to start, a drive system of the vehicle 8 by a push operation (ON operation), and instruct to stop the drive system by a next push operation (OFF operation).

Start-up of the drive system of the vehicle 8 and the power state transition of the vehicle 8 are judged by, e.g., the vehicle control unit 88 based on an instruction signal $S_3$ output from the start switch device 1 and the operating conditions for a shifting device, etc.

In particular, when the drive system is an internal combustion engine (an engine), the engine is started by a push operation performed in a state in which the operating conditions for the shifting device or a braking device are met. Meanwhile, when the drive system is a motor, preparation for start, which is a current supply to the motor, is carried out by a push operation performed in a state in which the above-described operating conditions are met. Furthermore, when the drive system is an engine/motor hybrid, start or preparation for start corresponding to the drive system prioritized at the time of start is carried out by a push operation performed in a state in which the above-described operating conditions are met. An OFF operation performed after this ON operation gives an instruction to stop the drive system.

Then, when a push operation is performed without activation of the brake device which is the operating condition, the start switch device 1 outputs the instruction signal $S_3$ to perform transition of power state such as between OFF (power off), ACC (allowing some of electronic devices to be used) or ON (allowing all electronic devices to be used), as an example. Based on, e.g., such an instruction signal $S_3$ and the above-mentioned operating condition, the vehicle control unit 88 controls the power source. In this regard, the biometric information authentication device is not limited to the start switch device 1 and may be used for, e.g., authentication for locking or unlocking doors or authentication for logging in to electronic devices, etc.

As shown in FIG. 2A, the start switch device 1 has, e.g., a control unit 5 that, during biometric authentication by comparing biometric information 23 of a user read by a biometric information sensor 2 to preliminarily registered biometric information 50 of a registered person, issues a notification to encourage the user to register different biometric information 23 when a predetermined condition for determining that a biometric authentication after a current biometric authentication is highly likely to fail is met.

As shown in FIGS. 2A, 3B and 3C, the control unit 5 has, e.g., an authentication threshold value $Th_1$ used for biometric authentication and a notification threshold value $Th_2$ for deciding whether or not issuing a notification, and is configured to issue a notification to encourage the user to register different biometric information 23 when the predetermined condition for determining that an authentication score obtained by comparing the biometric information 23 to the registered biometric information 50 is not less than the authentication threshold value $Th_1$ and not more than the notification threshold value $Th_2$ is met.

As a modification, the control unit 5 may be configured to set a notification range including the authentication threshold value $Th_1$ and to issue a notification to encourage the user to register different biometric information 23 when the authentication score is within the notification range.

As shown in FIG. 1B, the start switch device 1 is also provided with, e.g., a cylindrical main body 10 and an operation button 12. The operation button 12 is inserted into an opening 102 of the main body 10. In addition, the start switch device 1 is further provided with, e.g., the biometric information sensor 2, a registration switch 3 and a switch unit 4, as shown in FIG. 2A.

Meanwhile, as an example, the vehicle 8 has a main monitor 86, a sub monitor 87 and the vehicle control unit 88, as shown in FIG. 2B.

As an example, the main monitor 86 is arranged on a center console 82 as shown in FIG. 1A, but it is not limited thereto. The main monitor 86 is, e.g., a liquid crystal monitor and carries out display based on a display signal $S_5$ output from the vehicle control unit 88.

As an example, the sub monitor 87 is arranged on an instrument panel 83 in front of the driver's seat, as shown in FIG. 1A. The sub monitor 87 is, e.g., a liquid crystal monitor and carries out display based on a display signal $S_6$ output from the vehicle control unit 88. The position for arranging the sub monitor 87 is not limited to, e.g., the instrument panel 83 and may be another position such as a head-up display, etc.

A message image 861 for a notification to encourage registration of different biometric information 23 is displayed on the main monitor 86 in the following description, but it is not limited thereto. The message image 861 may be displayed on the sub monitor 87 or may be displayed on the main monitor 86 and the sub monitor 87. Furthermore, as a modification, the notification to encourage registration of different biometric information 23 may be issued by a sound or a combination of the message image 861 and a sound. In addition, the configuration may be such that, e.g., the notification is produced on the start switch device 1.

The vehicle control unit 88 is, e.g., a microcomputer composed of a CPU (Central Processing Unit), and a RAM (Random Access Memory) and a ROM (Read Only Memory) as semiconductor memories, etc. The vehicle control unit 88 is electromagnetically connected to the start switch device 1 via, e.g., an in-vehicle LAN such as CAN (Controller Area Network) or LIN (Local Interconnect Network).

(Configuration of the Biometric Information Sensor 2)

The biometric information sensor 2 is arranged so that, e.g., a reading surface 20 is exposed on an operation surface 120 of the operation button 12, as shown in FIG. 1B.

The biometric information sensor 2 is configured to read, e.g., a fingerprint of the operating finger 9 as the biometric information 23, as shown in FIGS. 1B and 2C. However, the biometric information 23 is not limited to the fingerprint of the operating finger 9 and may be a vein of the operating finger 9, a vein of a palm, an iris of an eye, or a shape of a portion of the body such as face. In addition, the biometric information sensor 2 does not need to be mounted on the start switch device 1 as long as it can read the biometric information 23 such as, e.g., iris even if located at a distance from an object to be operated.

In case of reading, e.g., a fingerprint, the biometric information sensor 2 used here is a sensor of optical, capacitive, electric field strength measuring, pressure-sensitive, or thermal type, etc., which is configured to read a fingerprint.

Meanwhile, in case of reading. e.g., a vein of the operating finger 9 or of a palm, the biometric information sensor 2 used is a sensor configured to read a vein based on reflection of emitted infrared radiation.

Then, in case of reading, e.g., both a fingerprint and a vein, the biometric information sensor 2 used is a sensor configured to extract a fingerprint and a vein by processing an image captured under visible light.

Furthermore, in case of reading, e.g., an iris, the biometric information sensor 2 used is a sensor configured to read an iris by processing an image captured under infrared light emission.

Still further, in case of reading, e.g., a shape of a portion of the body such as face, the biometric information sensor 2 used is a sensor configured to read an uneven shape on a subject based on depths at plural measurement points on the captured subject.

The biometric information sensor 2 in the present embodiment is a capacitive sensor that reads a fingerprint, as an example. This biometric information sensor 2 is configured to read the biometric information 23 from the operation finger 9 which is in contact with the reading surface 20 when the user performs a push operation on the operation button 12. Alternatively, the reading surface 20 may be arranged under the operation surface 120 without being exposed on the operation surface 120.

The biometric information sensor 2 is provided with, e.g., plural detection electrodes which are arranged in rows and columns in a grid pattern under the reading surface 20. As an example, several ten thousand to several hundred thousand detection electrodes are formed and arranged at intervals of several μm to several tens μm.

The biometric information sensor 2 is configured to scan all detection electrodes by, e.g., repeating a process of reading capacitances of the detection electrodes arranged in one row while changing columns and then subsequently reading capacitances of the detection electrodes arranged in a different row. The scanning cycle is about 100 ms, as an example.

The biometric information sensor 2 outputs, e.g., a captured image 22, which is formed based on plural capacitances read by scanning, to the control unit 5. The captured image 22 is formed based on, e.g., capacitances in one cycle.

In particular, the biometric information sensor 2 generates the captured image 22 by, e.g., classifying the capacitances into capacitances of not less than a predetermined threshold value to be assigned "1" and capacitances of less than the threshold value to be assigned "0" and associating the capacitances with the positions of the detection electrodes.

The captured image 22 shown in FIG. 2C is produced in such a manner that the positions of the detection electrodes assigned "1" described above are shown in black and the positions of the detection electrodes assigned "0" are shown in white, as an example. The circles in the drawing are added to show some of characteristic features 6 (described later).

The high-capacitance positions are positions of ridges of the fingerprint which are close to the detection electrodes, hence, capacitance is high. Meanwhile, the low-capacitance positions are positions of valleys of the fingerprint which are far from the detection electrodes, hence, capacitance is low. Therefore, as an example, the captured image 22 shown in FIG. 2C is obtained when the high-capacitance positions are shown in black and the low-capacitance positions are shown in white. The image shown in black in the captured image 22 is the read biometric information 23.

The control unit 5 may be configured to, e.g., select a captured image 22, which is suitable for extraction of the characteristic features 6, from plural captured images 22 captured after the contact of the operating finger 9 with the reading surface 20, or may be configured to use the captured image 22, which is captured by being triggered by the event that the switch unit 4 is turned on, for extraction of the characteristic features 6.

(Configuration of the Registration Switch 3)

As an example, the registration switch 3 is arranged adjacent to the main body 10, as shown in FIG. 1B. The registration switch 3 may be, e.g., a physical switch or a capacitive touch switch. The registration switch 3 in the present embodiment is configured as a touch switch.

After, e.g., successful authentication by a mobile device such as electronic key and successful biometric authentication by the start switch device 1, a registered person can select a registration mode for registering the registered biometric information 50 by performing a touch operation on the registration switch 3.

The registration mode is a mode allowing for a new registration of the registered biometric information 50. In this regard, when, e.g., the registration switch 3 is not operated, the start switch device 1 is in an authentication mode. The authentication mode is a mode for performing biometric authentication.

The registration switch 3 when received a touch operation outputs a mode signal $S_1$ to the control unit 5. When, e.g., the mode signal $S_1$ is input, the control unit 5 generates and stores the registered biometric information 50 based on the biometric information 23 acquired from the biometric information sensor 2.

(Configuration of the Switch Unit 4)

As an example, the switch unit 4 is configured as a rubber dome switch which comes into contact with an end portion of the operation button 12 on the opposite side to the operation surface 120. The rubber dome switch is provided with, e.g., a rubber dome which generates an elastic force and has a movable contact, and a switch substrate on which the rubber dome is arranged and which has a fixed contact facing the movable contact.

When the operation button 12 is pushed into the main body 10 by a push operation, the movable contact is electrically conducted to the fixed contact due to deformation of the rubber dome and a switch signal $S_2$, which indicates that the switch is turned on, is output to the control unit 5. The start switch device 1 is configured that when, e.g., the push operation ends, the operation button 12 returns to the initial position by an elastic force of the rubber dome.

(Configuration of the Control Unit 5)

The control unit 5 is, e.g., a microcomputer composed of a CPU performing calculation and processing, etc., of the acquired data according to a stored program, and a RAM and a ROM as semiconductor memories, etc. The ROM stores, e.g., a program for operation of the control unit 5. The RAM is used as, e.g., a storage area for storing the registered biometric information 50, the authentication threshold value $Th_1$, the notification threshold value $Th_2$, and calculation results, etc. In addition, the control unit 5 has, inside thereof, a means for generating a clock signal, and operates based on the clock signal.

The registered biometric information 50 is, e.g., information associating a registered person's name 50*a* with a template 50*b* of each registered person, as shown in FIG. 3A. The registered person's name 50*a* may be associated with, e.g., an electronic key or mobile device, and may be input by operating an input device. However, it is not limited thereto.

In the registered biometric information 50 shown in FIG. 3A, the biometric information 23 (fingerprints) of registered persons A to C are registered, as an example. The registered person A has registered, e.g., a fingerprint $A_1$ and a fingerprint $A_2$ as the template 50b. The fingerprint $A_1$ and the fingerprint $A_2$ are, e.g., the template 50b of different fingers of the registered person A. Meanwhile, the registered person B has registered, e.g., a fingerprint $B_1$ as the template 50b. Furthermore, the registered person C has registered, e.g., a fingerprint $C_1$ as the template 50b.

This template 50b is created based on the read biometric information 23 and is composed of mainly the characteristic features 6. Here, registering such biometric information 23 means that the temperate 50b is created based on the biometric information 23 and the registered biometric information 50 is produced by associating the created template 50b with the registered person's name 50a. Next, the characteristic feature 6 will be described.

The control unit 5 performs, e.g., an extraction process on the captured image 22 and extracts the characteristic features 6. The extraction process is, e.g., a process of extracting fingerprint ridges, etc.

The characteristic feature 6 is, e.g., a center point, a bifurcation point, an ending point or a delta, etc., as shown in FIG. 2C, but it is not limited thereto. The center point is a point at the center of the fingerprint. The bifurcation point is a point at which a fingerprint ridge bifurcates. The ending point is a point at which a ridge ends. The delta is a point at which ridges from three directions meet.

The control unit 5 extracts, e.g., the characteristic features 6 from the captured image 22. The control unit 5 then compares, e.g., the acquired registered biometric information 50 to the biometric information 23 from which the characteristic features 6 are extracted, and calculates a degree of similarity as the authentication score based on the positions of the characteristic features 6 and distances between the characteristic features 6, etc. Then, when the switch unit 4 is ON and the degree of similarity is not less than the authentication threshold value $Th_1$, the control unit 5 outputs the instruction signal $S_3$ upon determination that the biometric information 23 is successfully authenticated.

The authentication threshold value $Th_1$ is 50%, as an example. In other words, when, e.g., the number of the characteristic features 6 of the biometric information 23 used for authentication is eighty and when not less than forty characteristic features 6 match those of the registered biometric information 50, the control unit 5 determines that the user is a registered person. The match here includes match of the position of the characteristic feature 6 and a distance between the characteristic features 6, etc.

The biometric authentication is not limited to being performed by the authentication method using the degree of similarity of the characteristic features 6 and may be performed by an authentication method such as pattern matching.

In the meantime, the vehicle control unit 88 may be configured to implement, e.g., settings of on-vehicle devices which have been set by the registered person who is biometrically authenticated, based on the acquired instruction signal $S_3$. The on-vehicle device when being, e.g., a seat driving device moves a seat to a seat position which has been set by the registered person. Meanwhile, the on-vehicle device when being, e.g., an air conditioner implements the settings, such as the set temperature and the air volume, which have been set by the registered person. Furthermore, the on-vehicle device when being, e.g., a mirror driving device drives mirrors to the positions which have been set by the registered person. Electromagnetic connection is, e.g., connection using at least one of connection via a conductor, connection via light which is a kind of electromagnetic wave, and connection via radio waves which is also a kind of electromagnetic wave.

The control unit 5 controls the biometric information sensor 2 so that the switch signal $S_2$ output from the switch unit 4 triggers scanning of the reading surface 20, as an example. In this case, since a push operation is being performed on the operation surface 120, a contact area between the operating finger 9 and the reading surface 20 is larger than that when touching the reading surface 20 before the push operation, and more characteristic features 6 can be extracted.

The notification threshold value $Th_2$ is a threshold value for deciding whether or not to issue a notification to encourage the user to register a finger other than the currently registered finger(s). The notification threshold value $Th_2$ is set to be, e.g., a higher threshold value than the authentication threshold value $Th_1$, as shown in FIG. 3B.

When the authentication threshold value $Th_1$ is 50%, the notification threshold value $Th_2$ is 80% as an example, but is not limited thereto.

In FIG. 3B, biometric information A (the authentication score: 45%), biometric information B (the authentication score: 55%) and biometric information C (the authentication score: 90%) are shown as an example. The authentication score in the present embodiment is a degree of similarity, but it is not limited thereto since it depends on an authentication method used for biometric authentication.

Biometric authentication of the biometric information A will fail since the degree of similarity as the authentication score is lower than the authentication threshold value $Th_1$. Meanwhile, biometric authentication of the biometric information B and the biometric information C will be successful since the degree of similarity is higher than the authentication threshold value $Th_1$. Particularly, biometric authentication of the biometric information C is highly likely to be successful from the next time onwards since the degree of similarity is much higher than the authentication threshold value $Th_1$.

On the other hand, the degree of similarity of the biometric information B is higher than the authentication threshold value $Th_1$ but with only a slight difference. Therefore, when the condition of the finger, which was read to provide the biometric information B, changes due to injury, etc., it is highly likely that the degree of similarity becomes lower than the authentication threshold value $Th_1$ in the next biometric authentication and onwards, resulting in a sudden failure.

Thus, when the degree of similarity is in a range of not less than the authentication threshold value $Th_1$ and not more than the notification threshold value $T_2$, the control unit 5 in the present embodiment generates and outputs a notification signal $S_4$ to issue a notification to encourage registration of a finger different from the finger which provided the read biometric information 23.

The notification signal $S_4$ is input to, e.g., the vehicle control unit 88 via an in-vehicle LAN, etc. The vehicle control unit 88 controls, e.g., based on the notification signal $S_4$ input thereto, so that the message image 861 is displayed on at least one of the main monitor 86 and the sub monitor 87.

FIG. 3C shows the message image 861 displayed on a display screen 860 of the main monitor 86, as an example. The message image 861 is "Register fingerprint of different finger" which is a massage image for encouraging the user to register another finger, as an example.

As a modification, the control unit 5 issues a notification to encourage the user to register different biometric information 23 when the predetermined condition is met plural times. In particular, the control unit 5 may be configured to issue a notification to encourage the user to register different biometric information 23 when the authentication score obtained by comparison to the same registered biometric information 50 becomes not less than the authentication threshold value $Th_1$ and not more than the notification threshold value $Th_2$ plural times, or plural times consecutively.

Figure 4:
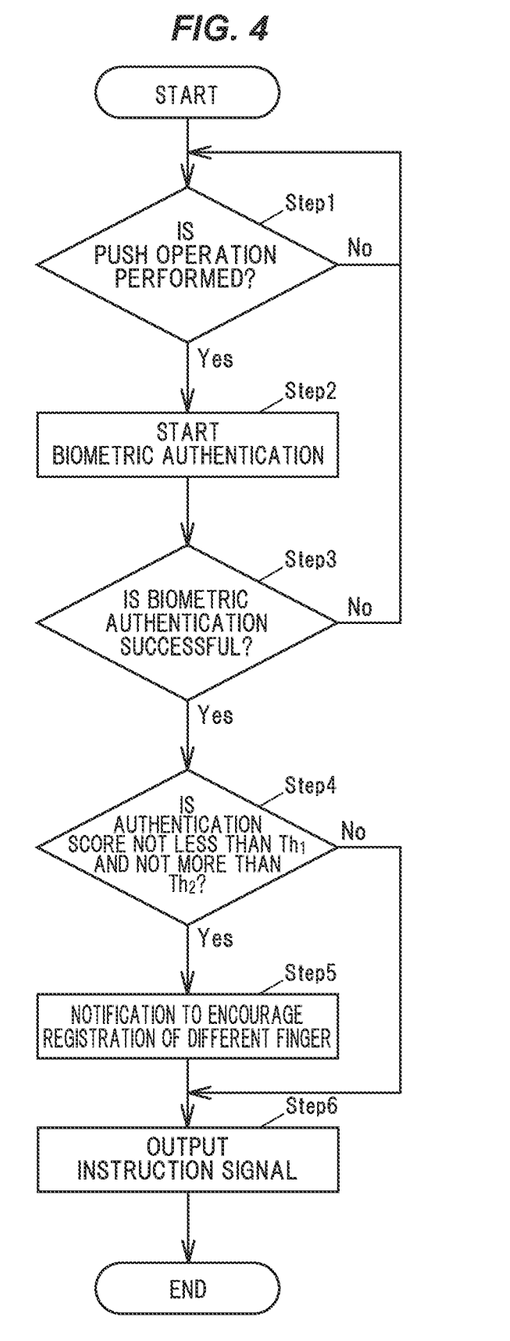
FIG. 4 is a flowchart showing an operation of the start switch device in the embodiment.

Next, an example of an operation of the start switch device 1 in the present embodiment will be described along with the flowchart of FIG. 4. In the following description, the case where the control unit 5 performs biometric authentication by being triggered by a push operation will be described as an example.

(Operation)

The control unit 5 of the start switch device 1 monitors the switch signal $S_2$ output from the switch unit 4. Then, when it is "Yes" in Step 1, i.e., when it is determined based on the switch signal $S_2$ that a push operation is performed (Step 1: Yes), the control unit 5 acquires the biometric information 23 by controlling the biometric information sensor 2 and starts biometric authentication (Step 2).

The control unit 5 compares the read biometric information 23 of the user to the registered biometric information 50. Then, when the authentication score is not less than the authentication threshold value $Th_1$ and biometric authentication is thus successful (Step 3: Yes), the control unit 5 checks whether or not the authentication score is not less than the authentication threshold value $Th_1$ and not more than the notification threshold value $Th_2$.

When the authentication score is not less than the authentication threshold value $Th_1$ and not more than the notification threshold value $Th_2$ (Step 4: Yes), the control unit 5 outputs the notification signal $S_4$ to issue a notification to encourage registration of another finger (Step 5). The control unit 5 also outputs the instruction signal $S_3$ upon determination that a push operation is performed and biometric authentication is successful (Step 6) and then ends the process.

Based on the notification signal $S_4$, the vehicle control unit 88 outputs the display signal $S_5$ for controlling the main monitor 86 to display the message image 861 on the display screen 860, thereby issuing a notification to encourage registration of another finger. The vehicle control unit 88 also starts the drive system and makes the power state transition based on the instruction signal $S_3$.

Meanwhile, when biometric authentication is not successful in Step 3 (Step 3: No), the control unit 5 proceeds the process to Step 1.

Then, when the authentication score is higher than the notification threshold value $Th_2$ in Step 4 (Step 4: No), the control unit 5 proceeds the process to Step 6 and outputs the instruction signal $S_3$.

Effects of the Embodiment

The start switch device 1 in the present embodiment can reduce distrust of users. In particular, w % ben the authentication score is not less than the authentication threshold value $Th_1$ and not more than the notification threshold value $Th_2$ and biometric authentication is highly likely to fail from the next time onwards, the start switch device 1 can encourage registration of different biometric information. Therefore, it is possible to suppress a sudden failure of biometric authentication and thereby reduce distrust of users, as compared to when not encouraging registration.

Although some embodiment and modifications of the invention have been described, these embodiment and modifications are merely examples and the invention according to claims is not to be limited thereto. These new embodiment and modifications may be implemented in various other forms, and various omissions, substitutions and changes, etc., can be made without departing from the gist of the invention. In addition, all combinations of the features described in these embodiment and modifications are not necessary to solve the problem of the invention. Further, these embodiment and modifications are included within the scope and gist of the invention and also within the invention described in the claims and the range of equivalency.

REFERENCE SIGNS LIST

1 Start Switch Device
2 Biometric Information Sensor
5 Control Unit
6 Characteristic Feature
22 Captured Image
23 Biometric Information
50 Registered Biometric Information
$Th_1$ Authentication Threshold Value
$Th_2$ Notification Threshold Value

The invention claimed is:

1. A biometric information authentication device, comprising
a digital processor that, during biometric authentication by comparing biometric information of a user read by a biometric information sensor to preliminarily registered biometric information of a registered person, issues a notification to encourage the user to register different biometric information when a predetermined condition for determining that a subsequent biometric authentication after a current successful biometric authentication may not succeed,
wherein the digital processor has an authentication threshold value used for biometric authentication and a notification threshold value for deciding whether or not issuing a notification, and when the predetermined condition for determining that an authentication score obtained by comparing the biometric information to the registered biometric information is not less than the authentication threshold value and not more than the notification threshold value is met, the digital processor both authenticates the user, and issues a notification to encourage the user to register different biometric information, and
wherein the different biometric information that the user is encouraged to register is biometric information concerning a different portion of the body of the user.

2. The biometric information authentication device according to claim 1,
wherein the digital processor issues a notification to encourage the user to register different biometric information when the predetermined condition is met a plurality of times.

3. The biometric information authentication device according to claim 1, wherein the digital processor issues a notification to encourage the user to register different biometric information when the predetermined condition is met a plurality of times consecutively.

4. The biometric information authentication device according to claim 1,
wherein the digital processor issues a notification to encourage registration of the biometric information by using a sound, display, or a combination of a sound and display.

5. The biometric information authentication device according to claim 1,
wherein, both the authentication threshold value and the notification threshold value are different values of a same type of biometric information measured by the biometric information sensor.

6. The biometric information authentication device according to claim 1,
wherein the digital processor extracts characteristic features from a captured image that is captured as the biometric information by the biometric information sensor, and calculates, based on the characteristic features, a degree of similarity as the authentication score by comparison to the registered biometric information.

7. The biometric information authentication device according to claim 1,
wherein the biometric information sensor reads one or more selected from a fingerprint, a vein, a shape of a portion of the body, and an iris of an eye, as the biometric information of the user, and the digital processor performs the authentication using one or more selected from a fingerprint, a vein, a shape of a portion of the body, and an iris of an eye that are pre-registered as the registered biometric information.

8. The biometric information authentication device according to claim 7,
wherein the biometric information sensor comprises a sensor of optical, capacitive, electric field strength measuring, pressure-sensitive, or thermal type that reads the fingerprint.

9. The biometric information authentication device according to claim 7,
wherein the biometric information sensor comprises a sensor configured to read the vein based on reflection of emitted infrared radiation.

10. The biometric information authentication device according to claim 1, wherein the biometric information of a user is a fingerprint of a finger, and wherein the different biometric information that the user is encouraged to register is a fingerprint of a different finger.

* * * * *